United States Patent [19]

Muramatsu

[11] Patent Number: 5,397,888
[45] Date of Patent: Mar. 14, 1995

[54] LIGHT CONTROL APPARATUS TO CONTROL THE QUANTITY OF INCIDENT LIGHT WITH A PLURALITY OF ELECTROCHROMIC PANELS

[75] Inventor: Rikuo Muramatsu, Moriguchi, Japan

[73] Assignee: Matsushita Electric Industrial Co., Ltd., Kadoma, Japan

[21] Appl. No.: 995,668

[22] Filed: Dec. 21, 1992

[30] Foreign Application Priority Data

Dec. 25, 1991 [JP] Japan .................. 3-341659

[51] Int. Cl.$^6$ .................. G01J 1/32
[52] U.S. Cl. .................. 250/205; 359/275; 345/105
[58] Field of Search .................. 250/205, 214 AL; 359/275, 267, 268, 269; 345/105

[56] References Cited

U.S. PATENT DOCUMENTS

| | | |
|---|---|---|
| 2,260,220 | 10/1941 | Grabau . |
| 2,464,954 | 3/1949 | Werth . |
| 3,443,855 | 5/1969 | Land et al. . |
| 3,669,526 | 6/1972 | Weiss . |
| 4,285,577 | 8/1981 | Schuler . |
| 4,338,000 | 7/1982 | Kamimori et al. .................. 359/275 |
| 4,892,394 | 1/1990 | Bidabad .................. 345/105 |
| 5,033,829 | 7/1991 | Faroughy . |
| 5,124,832 | 6/1992 | Greenberg et al. .................. 359/275 |
| 5,231,531 | 7/1993 | Defendini et al. .................. 359/275 |

Primary Examiner—David C. Nelms
Assistant Examiner—Que T. Le
Attorney, Agent, or Firm—Ratner & Prestia

[57] ABSTRACT

A light control board comprises a plurality of electrochromic panels which are composed of electrochromic elements and which are situated in one plane. Control means controls the optical transmissivity of each of the electrochromic panels. Thus, the quantity of light passing through the light control board is controlled with resultant illumination control of an empty space. By employing belt-shaped electrochromic panels, it is possible to block or pass the light partially at the surface of the light control board for effective utilization of light according to an intended purpose. Furthermore, by incorporating measurement means into the light control apparatus to detect environmental conditions inside as well as outside, it is also possible to utilize light more efficiently in compliance with changes in surrounding conditions.

15 Claims, 4 Drawing Sheets

LIGHT CONTROL APPARATUS TO CONTROL THE QUANTITY OF INCIDENT LIGHT WITH A PLURALITY OF ELECTROCHROMIC PANELS

BACKGROUND OF THE INVENTION

This invention relates to a light control apparatus to control the quantity of incident light utilizing the changes in optical transmissivity of an electrochromic element.

In recent years, the importance of the earth's resource conservation efforts has been receiving great attention and energy saving activity as part of such efforts is becoming important. As one of the specific ways to save energy, it is considered important to try to make the most of daylight in planning on construction of houses and offices. There is a report that productivity at a factory is enhanced by lighting the factory by funneling daylight into it. Also, it is considered very valuable to develop a method of controlling the daylight utilization for interior illumination. One simple daylight controlling system is a window-shade. One recently developed system is an application of an electrochromic element in the form of a dimming glass which has a construction of transparent electroconductive layers, an electrochromic layer and an electrolyte being contained between dimming glass substrates. When a DC voltage of 1.5 to 3 volts is applied across the transparent electroconductive layers, a reducing process takes place in the electrochromic layer with resultant coloring of the dimming glass. The optical transmissivity of the dimming glass is changed according to the application period of the voltage. In addition, a reversed reaction is caused when the polarity of the applied voltage is reversed, with resultant color vanishing of the dimming glass.

This is explained in FIG. 4, which primarily shows a cross-sectional view of an electrochromic element. An electrochromic element comprises at least two of a dimming glass substrate 11, two of a transparent electroconductive layer 12 for applying a voltage between the two dimming glass substrates, an electrochromic layer 13 for a reducing reaction and an electrolyte 14 as a source of ions. Besides, FIG. 4 shows a sealing material 15, bus bars 16 serving as the terminals for voltage application, an intermediate layer 17, a counter electrode 18 and a DC power supply 19.

When a DC voltage from the DC power supply 19 is applied across the transparent electroconductive layers 12, a reducing reaction takes place in the electrochromic layer causing it to take on a color. On the other hand, an oxidation reaction takes place at the surface of the counter electrode 18 and proceeds until it reaches a point where a balance is taken between the reducing reaction and the oxidation reaction according to the law of conservation of charge, with a resultant completion of coloring of the electrochromic element. Thus, it is possible to control light with the optical transmissivity of the electrochromic element being changed.

Moreover, even after elimination of the applied DC voltage, the status of coloring of the electrochromic element is sustained due to a memory effect. When the polarity of the applied voltage is reversed, the color of the electrochromic element vanishes due to a reversed reaction taking place within the element. The optical transmissivity (depth of color) of the electrochromic element can be controlled by the quantity of electric charge passing through the element.

When the aforementioned window-shade is used in controlling light, a special fixture for the window-shade has to be installed, resulting in a rather complicated appearance around the window. Besides, a window-shade provides means of adjusting incident daylight only by either horizontal slatting or vertical slatting. In the case of the foregoing dimming glass of a relatively recent development as applied to a light control system, the dimming glass just replaces the whole ordinary glass pane covering a window opening, providing the whole window area with a uniform light controlling capability, not providing a capability of controlling light with its intensity varied from place to place. Therefore, when strong daylight is transmitted through the dimming glass causing the light reflection on a desk near the window to be too strong, the optical transmissivity of the electrochromic element as used in the dimming glass has to be lowered uniformly over all of the glass area, not allowing a regional control of the light with resultant inefficiency in utilizing the daylight. Besides, the daylight taken in is dispersed by the dimming glass resulting in an elimination of the directional qualities, by which the daylight interior illumination is characterized.

SUMMARY OF THE INVENTION

Taking the aforementioned problems involved with the conventional light control systems into consideration, this invention aims to provide a light control apparatus that can control lighting freely in its scope and magnitude as required and also can effectively take in effectively light having directional qualities.

In order to achieve the foregoing object, the light control apparatus of this invention comprises a plural number of electrochromic panels positioned on a plane to form a light control board, each panel being composed of electrochromic elements, and a controller to control the optical transmissivity of the individual electrochromic panels and places the light transmitted from the light sources under control by means of the aforementioned light control board.

In addition, an electrochromic panel has a belt-shaped configuration and by having a plural number of such electrochromic panels placed in parallel with one another, adjustment of light by the unit of each foregoing electrochromic panel is made possible with a resultant flexible control of the shedding light along the vertical direction of the light control board according to the requirements. Also, an electrochromic panel has a circular belt configuration and by having a plural number of such panels with various sizes placed on a plane coaxially to form a light control board, the light passing through the board can be controlled in its intensity along the diameter of the light control board freely according to the requirements.

In addition to the foregoing constitution and capability, the light control apparatus of this invention has an outdoor condition measurement means whereby the intensity of outdoor illumination or brightness is measured, an indoor condition measurement means whereby the intensity of indoor illumination or brightness is measured, optionally an incident sun light path angle measurement means whereby an angle of the incident sun light path is measured, a computing means whereby the optimum optical transmissivity for each respective electrochromic panel and the optimum combination of the electrochromic panels are gained by computation of the signals outputted from the aforementioned outdoor condition measurement means, the indoor condition measurement means and sometimes the incident sun light path angle measurement means and a control means whereby the optical transmissivity of each respective electrochromic panel is controlled.

The light control apparatus of the foregoing constitution as disclosed by this invention employs a light control board having a plural number of electrochromic panels placed on a plane with the optical transmissivity of each respective panel controlled independently and makes it possible to control the light passing through the light control board by region of the board. Besides, with the conventional dimming glass, the optical transmissivity is changed in an analog way and the light after passing through the glass is dispersed with no optical directivity, giving an impression of the light passing through a shaded glass and resulting in a difficulty in controlling the brightness of the place intended. On the other hand, with the light control board of this invention, the optical transissivity of the electrochromic panels constituting the board can be controlled in a digital manner between the two extreme values, the minimum and the maximum values, for each respective panel, thus enabling the light with an optical directivity to transmit or block the light effectively at places as required. For example, this method enables the daylight reflecting on a desk by the window to be reduced and the one entering indoors to be maximized, resulting in a full utilization of the daylight and a creation of the comfortable optical environment and also a contribution to the energy saving. Moreover, utilization of the outdoor condition measurement means, the indoor condition measurement means or the incident sun light path angle measurement means according to the requirements, computation of the measurement results from the aforementioned means to meet the purposes intended and controlling of the light control apparatus based on the computed results inputted into the control means make it possible to control light accurately for satisfying requirements.

Keys to the drawings:
1 Outdoor Condition Measurement Means
2 Indoor Condition Measurement Means
3 Incident Sun Light Path Angle Measurement Means
4 Computation Means
5 Control Means
6 DC Power Supply
7a through 7t Dimming Glass Substrates
8 Light Control Apparatus
9 Light Control Board

DETAILED DESCRIPTION OF THE INVENTION

Figure 1:
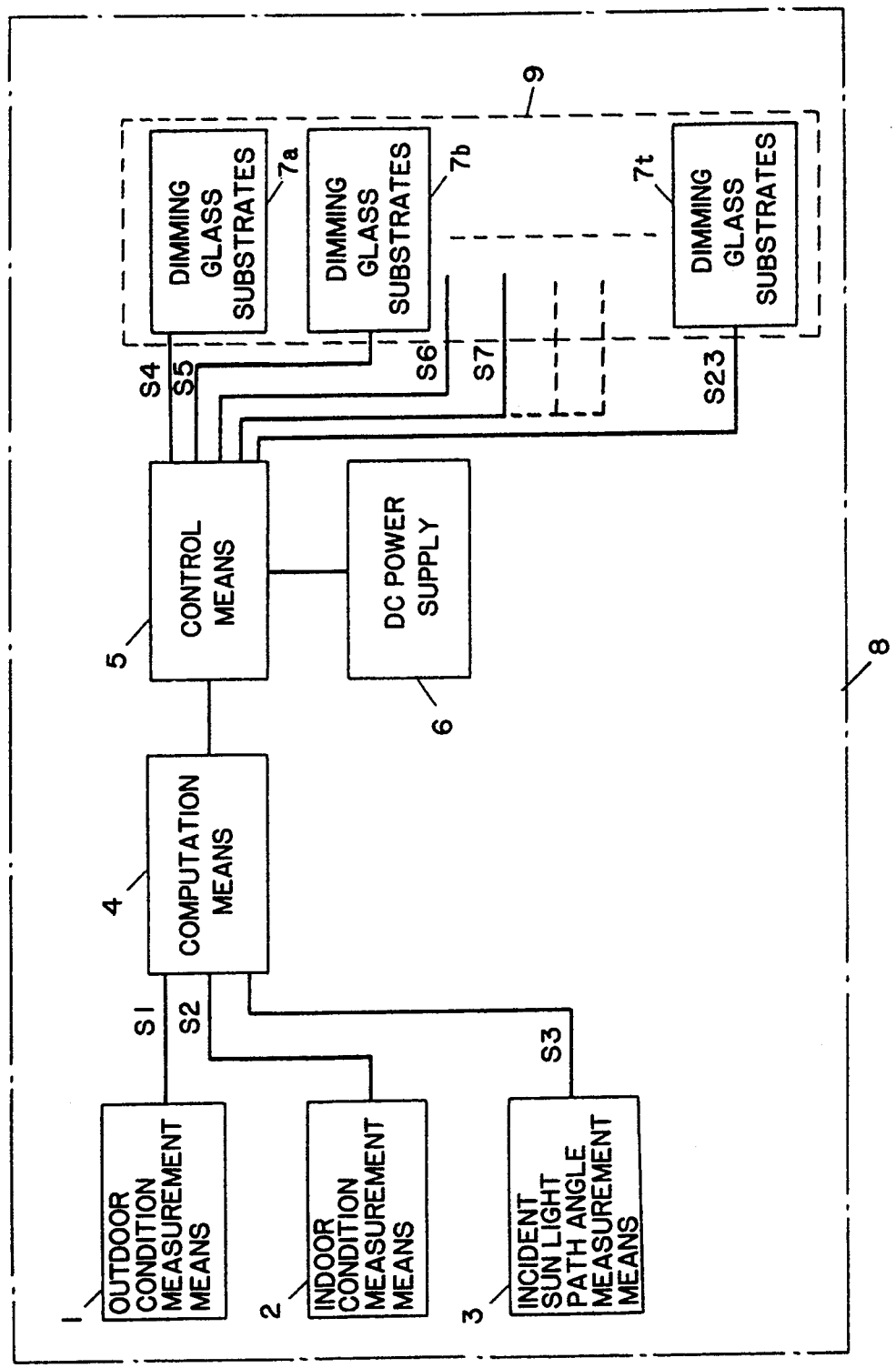
FIG. 1 is a block diagram to show an exemplary embodiment of a light control apparatus according to the present invention.

An exemplary embodiment of the present invention is explained with the help of drawings as follows:

FIG. 1 is a block diagram to show an exemplary light control apparatus in accordance with the present invention. Item 1 is an outdoor condition measurement means to measure the outdoor illumination intensity, item 2 is an indoor condition measurement means to measure the indoor illumination intensity, item 3 is an incident sun light path angle measurement means to measure the incident path angle of the sun light, item 4 is computation means, item 5 is control means to control electrochromic panels, item 6 is a DC power supply to supply DC voltages to the apparatus and items 7a through 7t are dimming glass substrates consisting which are electrochromic panels.

All of these items may be contained in one framework to constitute a light control apparatus 8 and put in position to control the light incident on the light control board 9 composed of the dimming glass substrates 7a through 7t.

Figure 2:
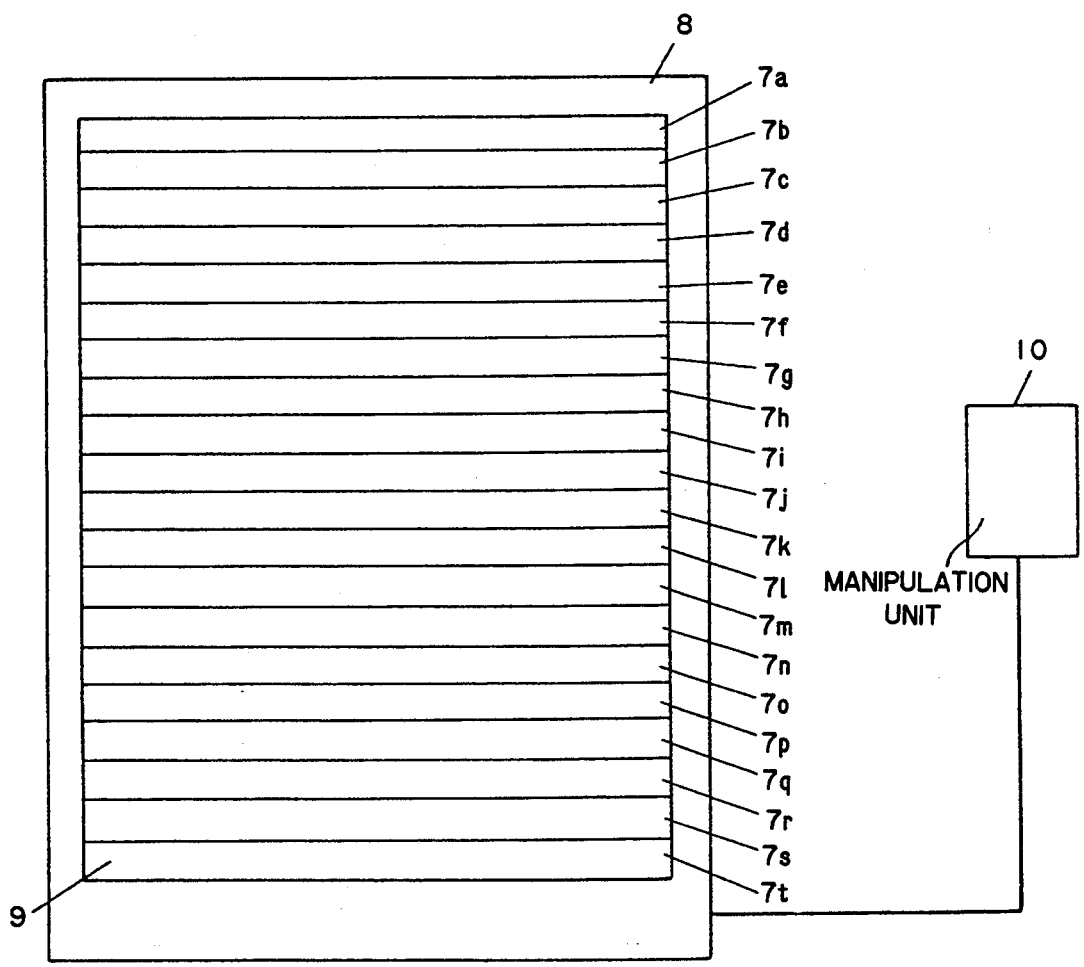
FIG. 2 is a schematic front view to show an exemplary light control board for use in a light control apparatus.

FIG. 2 illustrates the aforementioned light control apparatus 8, wherein the light control board 9 composed of the dimming glass substrates 7a through 7t is placed flat in the central position. Other items of FIG. 1 having various controlling functions are also contained in the framework of the light control apparatus 8. In the case of FIG. 2, such various controlling functions are specially put together and contained in a manipulation unit 10 which may be additionally equipped with a remote control function.

In FIG. 1, outdoor condition measurement means 1, indoor condition measurement means 2 and a sun light path angle measurement means 3 are connected to computation means 4. The measurement results S1, S2 and S3 taken on the outdoor illumination intensity by outdoor condition measurement means 1, the indoor illumination intensity by indoor condition measurement means 2 and the sun light path angle by sun light path angle measurement means 3 respectively are fed into computing means 4 to gain the optimum values in the optical transmissivity for each of dimming glass substrates 7a through 7t by the computation based on a certain calculation program.

Figure 4:
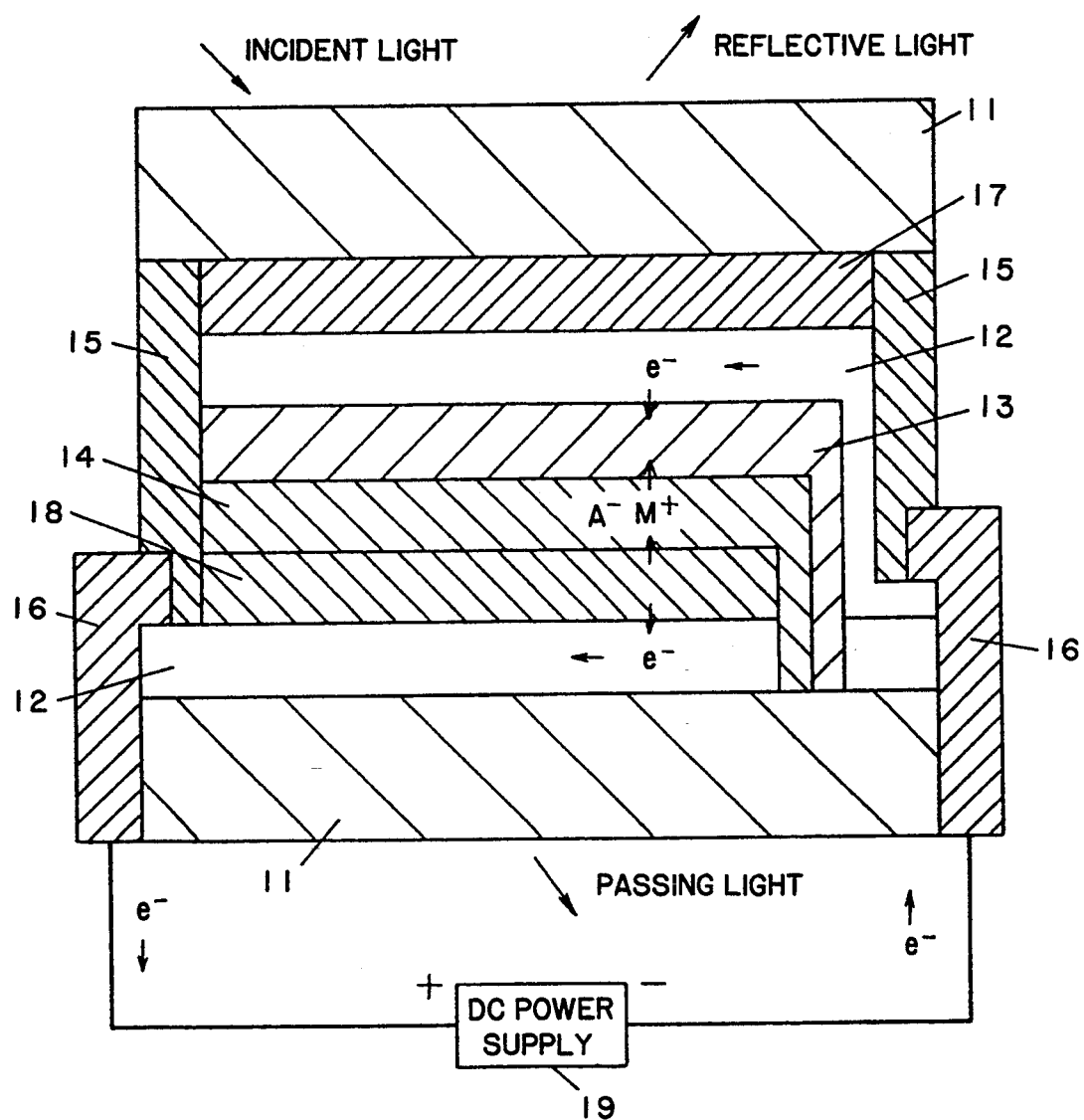
FIG. 4 is a cross-sectional view of a conventional electrochromic element.

Control means 5 coupled to computation means 4 is further coupled to a DC power supply 6 and the dimming glass substrates 7a through 7t. Control means being supplied by the DC power supply 6 with a DC voltage needed for electrochromic grading controls the optical transmissivity of each of the dimming glass substrates 7a through 7t separately based on the calculation results outputted from computation means 4 with a resultant adjustment of the quantities of the incident light. As shown in FIG. 2 and FIG. 4, the light control apparatus 8 comprises a light control board 9 consisting of twenty dimming glass substrates 7a through 7t, each of which has transparent electroconductive layers 12, an electrochromic layer 13 and an electrolyte layer 14. A reducing process takes place in the electrochromic layer 13 when a DC voltage from the DC power supply 6 is applied across the transparent electroconductive layers 12 and the optical transmissivity of the electrochromic layer can be changed independently, irrespective of the condition of the electrochromic layers of other dimming glass substrates.

In FIG. 1, the calculation results from computation means 4 are inputted to control means 5 which, instead, outputs control signals S4 through S23. The optical transmissivity of the dimming glass substrate 7a is changed by the control signal S4, the optical transmissivity of the dimming glass substrate 7b is changed by the control signal S5. The same process repeats until the optical transmissivity of the dimming glass substrate 7t is changed by the control signal S23. On the other hand, the control signals S4 through S23 can also be outputted by manual operation of the control means 5 which is included in the manipulation means 10 as shown in FIG. 2.

Since the optical transmissivity of each individual dimming glass substrate of 7a through 7t can be controlled separately, such an arrangement, for instance, as having the optical transmissivity of one or more or a group of the dimming glass substrates located in the lower part of the light control board (the dimming glass substrates 7n through 7t, for example) made low and the optical transmissivity of one or more or a group of the dimming glass substrates located in the upper part of the light control board (the dimming glass substrates 7a through 7m, for example) made high can provide a comfortable visual environment wherein a reflection made at a desk surface by strong sun shine can be eliminated and at the same time daylight can be introduced indoors extensively through the portion of the light control board with a resultant effective utilization of daylight.

Besides, by coping with the outdoor as well as the indoor light environment and the sun light path angle, both changing every moment, through various sensing means, a more effective utilization of daylight is made possible with a resultant contribution to energy saving.

Furthermore, by lowering the optical transmissivity of the dimming glass substrates located below the height of human beings, cutting off the line of vision from outside while clothes are changed (for example) is made possible. Also, by making high and low stripes in the optical transmissivity of one or more or a group of the dimming glass substrates, creating a window-shade like effect is made possible. All of the aforementioned arrangement can be executed either by an operating program built in computing means 4 in advance or by a manual operation through manipulating means 10.

Figure 3A:
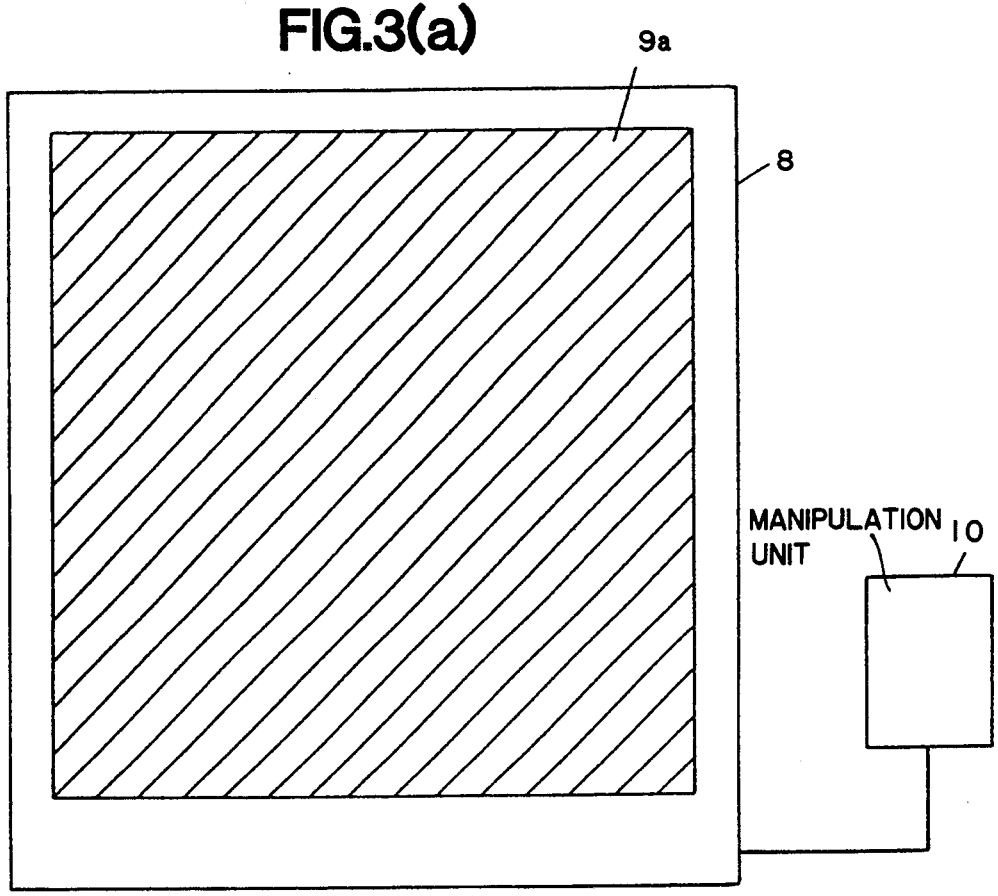
FIGS. 3 (a) and 3(b) are schematic front views to show other exemplary light control boards for use in a light control apparatus.
Figure 3B:
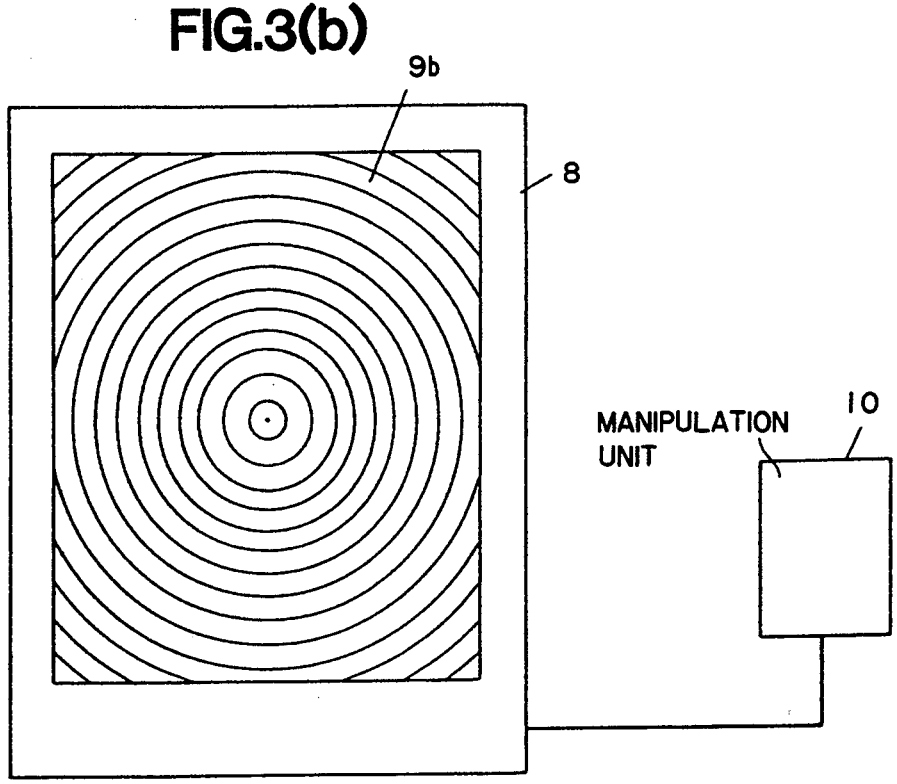

In addition, by having the configurations and the placement patterns of one or more or a group of the dimming glass substrates 7a through 7t serving as the electrochromic panels mounted on the light control board 9 changed as shown in FIGS. 3 (a) and 3(b), a light control that cannot be performed by an ordinary window-shade is made possible. FIG. 3 (a) shows that the dimming glass substrates 7a through 7t are placed on the light control board making an angle of 45 degrees against the vertical line. FIG. 3 (b) shows that the configurations of the dimming glass substrates 7a through 7t are made in a circular belt form with different dimensions and such circular belt shaped substrates are placed in a concentric pattern. Thus, by using a light control board with a special arrangement of electrochromic panels like the light control board 9a or 9b, controlling of the light shedding vertically or diagonally is made possible to meet requirements. In addition, the configuration of the electrochromic panels of FIG. 3 (a) is not necessarily required to be straight edged. Likewise, the configuration of the electrochromic panels of FIG. 3 (b) is not necessarily required to be a true circle.

According to the present invention as explained in the foregoing, by constituting a light control board with plural electrochromic panels wherein the optical transmissivity can be made variable independently from panel to panel, the quantities of the incident light can be controlled independently at any place of the light control board contributing to the creation of a comfortable visual environment by an effective control of the daylight and also to the cause of energy saving. In addition, a provision for automatic control through sensing of the light environmental conditions existing outdoors and indoors (and changing every moment) and also the sun light path angle makes it possible to utilize the daylight effectively without bothering an operator of the apparatus in adjusting the optical transmissivity of the electrochromic panels after a judgment of the indoor light condition. Moreover, it is possible to use the electrochromic panels by changing their configurations for emitting spot light like or decorative illuminations.

What is claimed is:

1. A light control apparatus comprising:
   a light control board which has a plurality of electrochromic panels spread over its surface; and control means for controlling the quantity of incident light passing through said light control board by separately controlling the optical transmissivity of each one of said plural electrochromic panels;
   wherein each of the plurality of electrochromic panels is a circular belt-shaped and the light control board has said plurality of panels in one plane.

2. A light control apparatus comprising:
   a light control board which has a plurality of electrochromic panels spread over its surface; and
   control means for controlling the quantity of incident light passing through said light control board by separately controlling the optical transmissivity of each one of said plural electrochromic panels;
   wherein each of said plurality of electrochromic panels has a first surface and a second surface, a lamination of a transparent substrate and a transparent electroconductive layer formed on each one of said first surface and said second surface respectively, and an electrochromic layer and an electrolyte layer, both being formed between said lamination formed on said first surface and said lamination formed on said second surface, and wherein the control means controls the voltage to be applied across said transparent electroconductive layer.

3. A light control apparatus comprising:
   a light control board which has a plurality of electrochromic panels spread over its surface; and
   control means for controlling the quantity of incident light passing through said light control board by separately controlling the optical transmissivity of each one of said plural electrochromic panels;
   wherein each of the plurality of electrochromic panels is belt-shaped and the light control board has said plurality of panels in one plane in order to control transmission of the incident light passing through said light control board.

4. A light control apparatus comprising:
   a light control board which has a plurality of electrochromic panels spread over its surface; and
   control means
   a) for controlling the quantity of incident light parsing through said light control board by separately controlling the optical transmissivity of each one of said plural electrochromic panels and b) for adjusting the optical transmissivity of one of said plural electrochromic panels to a first optical transmissivity level and the optical transmissivity of another of said plural electrochromic panels to a second optical transmissivity level at substantially the same time, said first optical transmissivity level different from said second optical transmissivity level.

5. A light control apparatus comprising:
a light control board which has a plurality of electrochromic panels spread over its surface; and
control means for controlling the quantity of incident light passing through said light control board by separately controlling the optical transmissivity of each one of said plural electrochromic panels;
light condition measurement means for measuring the intensity of light illumination at a predetermined location and for outputting an illumination signal,
wherein said control means is for separately controlling the optical transmissivity of each one of said plurality of electrochromic panels as a function of said illumination signal.

6. A light control apparatus comprising:
a light control board which has a plurality of electrochromic panels spread over its surface, control means for controlling the optical transmissivity of each of said plurality of electrochromic panels, outdoor condition measurement means for measuring the intensity of outdoor illumination, indoor condition measurement means for measuring the intensity of indoor illumination; and
computing means for processing illumination data outputted from said outdoor condition measurement means and said indoor condition measurement means and for producing a first output, wherein the control means controls the quantity of incident light passing through said light control board by controlling the optical transmissivity of each of said plurality of electrochromic panels in response to said first output of said computing means.

7. A light control apparatus according to claim 6, wherein
each of said plurality of electrochromic panels has a first surface and a second surface, a lamination of a transparent substrate and a transparent electroconductive layer formed on each one of said first surface and said second surface respectively, an electrochromic layer and an electrolyte layer, both being formed between said lamination formed on said first surface and said lamination formed on said second surface, and wherein the control means controls the voltage to be applied across said transparent electroconductive layer.

8. A light control apparatus according to claim 6, wherein
each of the plurality of electrochromic panels is belt-shaped and the light control board has said plurality of panels in one plane in order to control transmission of the light passing through said light control board.

9. A light control apparatus according to claim 6, wherein each of the plurality of electrochromic panels is circular belt-shaped and the light control board has said plurality of panels in one plane.

10. A light control apparatus according to claim 6, wherein the plurality of electrochromic panels are divided into groups, each group comprising ones of said plurality of electrochromic panels and wherein the control means controls said plurality of electrochromic panels by controlling the optical transmissivity of said groups.

11. A light control apparatus comprising:
a light control board which has a plurality of electrochromic panels spread over its surface,
control means for controlling the optical transmissivity of each of said plurality of electrochromic panels,
outdoor condition measurement means for measuring the intensity of outdoor illumination,
indoor condition measurement means for measuring the intensity of indoor illumination;
sun light path angle measurement means for measuring sun light path angle; and
computing means for processing illumination data outputted from said outdoor condition measurement means, said indoor condition measurement means and said sun light path angle measurement means and for producing a first output, wherein the control means controls the quantity of incident light passing through said light control board by controlling the optical transmissivity of each of said plurality of electrochromic panels in response to said first output of said computing means.

12. A light control apparatus according to claim 11, wherein each of said plurality of electrochromic panels has a first surface and a second surface, a lamination of a transparent substrate and a transparent electroconductive layer formed on each one of said first surface and said second surface respectively, and an electrochromic layer and an electrolyte layer, both being formed between said lamination formed on said first surface and said lamination formed on said second surface, and wherein the control means controls the voltage to be applied across said transparent electroconductive layer.

13. A light control apparatus according to claim 11, wherein each of the plurality of electrochromic panels is belt-shaped and the light control board has said plurality of panels in one plane in order to control transmission of the incident light passing through said light control board.

14. A light control apparatus according to claim 11, wherein each of the plurality of electrochromic panels is circular belt-shaped and the light control board has said plurality of said plurality of panels in one plane.

15. A light control apparatus according to claim 11, wherein the plurality of electrochromic panels are divided into groups, each group comprising ones of said plurality of electrochromic panels and wherein the control means controls said plurality of electrochromic panels by controlling the optical transmissivity of said groups.

* * * * *